(12) United States Patent
Moyer et al.

(10) Patent No.: US 8,590,113 B2
(45) Date of Patent: Nov. 26, 2013

(54) METHODS AND APPARATUS FOR APPLYING TENSION TO A MOTION TRANSMISSION ELEMENT

(75) Inventors: Ilan Moyer, Potomac, MD (US); Maxim Lobovsky, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 295 days.

(21) Appl. No.: 13/116,504

(22) Filed: May 26, 2011

(65) Prior Publication Data

US 2011/0289741 A1    Dec. 1, 2011

Related U.S. Application Data

(60) Provisional application No. 61/348,350, filed on May 26, 2010.

(51) Int. Cl.
*F16G 3/00* (2006.01)
*B25B 25/00* (2006.01)

(52) U.S. Cl.
USPC ............................ 24/32; 24/31 F; 474/253

(58) Field of Classification Search
USPC ............. 24/31 B, 31 C, 31 F, 31 R, 32, 38 D, 24/68 CT, 68 D, 68 R, 69 ST, 69 TM, 70 ST, 24/71 ST, 71 TT, 71.1; 198/813, 844.2; 474/253; 49/360
See application file for complete search history.

(56) References Cited

U.S. PATENT DOCUMENTS

| | | | |
|---|---|---|---|
| 2,906,143 A | 9/1959 | Musser | |
| 3,351,179 A * | 11/1967 | Thomson | 198/825 |
| 4,370,778 A * | 2/1983 | Madsen | 452/48 |
| 4,945,293 A | 7/1990 | Wittkopf et al. | |
| 5,979,639 A * | 11/1999 | Sytema | 198/731 |
| 6,216,849 B1 * | 4/2001 | Sytema | 198/731 |
| 6,868,747 B2 | 3/2005 | Goser et al. | |
| 6,913,553 B2 * | 7/2005 | Chopra | 474/253 |
| 7,220,198 B2 * | 5/2007 | Iida | 474/253 |
| 7,707,693 B2 * | 5/2010 | Schaefer | 24/31 R |
| 7,810,219 B2 * | 10/2010 | Lindemann | 24/31 R |
| 7,922,613 B2 * | 4/2011 | Iida | 474/140 |
| 8,464,469 B2 * | 6/2013 | Oberheide | 49/360 |
| 2008/0200295 A1 * | 8/2008 | Schaefer | 474/255 |
| 2010/0312395 A1 * | 12/2010 | Oberheide et al. | 700/275 |
| 2010/0325965 A1 * | 12/2010 | Hawkins et al. | 49/360 |

* cited by examiner

*Primary Examiner* — Robert J Sandy
*Assistant Examiner* — Louis Mercado
(74) *Attorney, Agent, or Firm* — Stephen R. Otis

(57) ABSTRACT

In exemplary implementations, tension is applied to a motion transmission element with periodic features by causing that element to mesh with a device that has a pitch slightly greater than the pitch of the motion transmission element. The motion transmission element with periodic features may include, for example: a belt with teeth, or a chain. Further, the motion transmission element may comprise either an open or a closed loop. In exemplary implementations, the width of the teeth of the motion transmission element is greater than the width of the teeth in the rack. This allows room for the teeth of the rack to both fit and move within the gap between the teeth in the motion transmission element. This extra width of the element's teeth is not necessary if the element is sufficiently elastic.

17 Claims, 5 Drawing Sheets

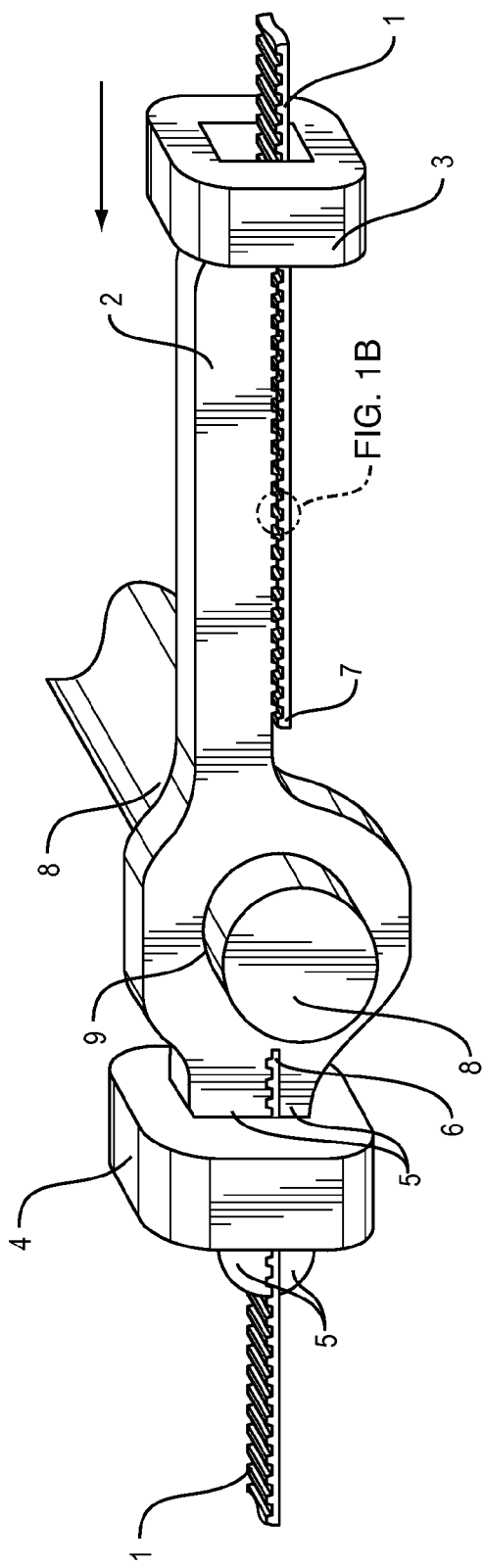
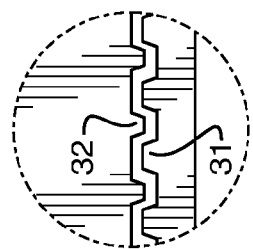
FIG. 1A
FIG. 1B

METHODS AND APPARATUS FOR APPLYING TENSION TO A MOTION TRANSMISSION ELEMENT

RELATED APPLICATIONS

This application claims the benefit of U.S. Provisional Application Ser. No. 61/348,350, filed May 26, 2010, the entire disclosure of which is herein incorporated by reference.

STATEMENT REGARDING FEDERALLY SPONSORED RESEARCH OR DEVELOPMENT

This invention was made with U.S. government support under grant or contract #W911 NF-08-1-0254, awarded by the Defense Advanced Research Projects Agency. The government has certain rights in this invention.

FIELD OF THE TECHNOLOGY

The present invention relates generally to devices for applying tension to motion transmission elements.

BACKGROUND

Many motion transmission elements have periodic features. For example, a toothed belt is a motion transmission element that has periodic features (the teeth). Or, for example, a chain can be a motion transmission element, and it has periodic features (the chain links).

SUMMARY

In an exemplary implementation of this invention, tension is applied to a toothed belt as follows: A clamp locally presses a belt and a rack together. The rack has a slightly larger pitch than the belt. In the area under pressure from the clamp, the teeth of the belt and the teeth of the rack locally engage (mesh) with each other. The clamp can be moved. As the clamp is slid along the long dimension of the rack and the belt, the area under pressure from the clamp (where teeth of the belt and teeth of the rack locally engage) moves. As the translation of the clamp occurs, engagement of the teeth of the rack and belt respectively, which are of different pitch, creates a first force along the long dimension of the belt in the direction of the translation. This first force causes the belt to be displaced in the direction that the clamp is moving. However, that first force is opposed by a second force that pulls the belt in an opposing direction. For example, the second force may be exerted by a second clamp holds another point in the belt stationary or moves it in an opposing direction. These opposing forces, pulling on two different points of the belt in opposing directions, create tension in the portion of the belt between those two points.

This invention is not limited to motion transmission elements that are toothed belts (also known as cog or notched belts). Instead, it applies to any motion transmission element with periodic features, such as a chain with links.

Any tooth shape or pattern may be used, as long as the motion transmission element and the device with greater pitch mesh. For example, helical offset teeth may be used to form a chevron pattern. Or, for example, involute teeth may be used.

In exemplary implementations, the motion transmission element may be a closed loop (i.e., form a continuous loop without ends) or an open loop (i.e., have ends along its long dimension, so that is does not form a continuous loop.).

In the case of either an open loop or closed loop, this invention may be used where the transmission element moves back and forth in an oscillatory fashion. For example, consider a belt in a rowing machine that oscillates back and forth over less than its full length. In that case, the fact that the clamp sits on several of the teeth of the belt is not a problem, because the clamp is on a portion of the belt that is not used to engage with another device.

In exemplary implementations of this invention, the width of the teeth of the motion transmission element (along that element's long axis) is greater than the width of the teeth in the rack (along the rack's long axis). This allows room for the teeth of the rack to both fit and move within the gap between the teeth in the motion transmission element. This extra width of the element's teeth is not necessary if the element is sufficiently elastic.

This invention has many practical advantages.

One advantage is that this invention can be implemented in such a way that it is simple to fabricate and install. For example, in an illustrative embodiment, this device can be made with as few as two separate parts, both of which can be fabricated through planar processes. In an illustrative embodiment, it can be installed without any hand tools.

A second advantage is that this invention can improve serviceability and reduce costs in a wide-range of machines containing motion transmission elements with periodic features, especially those that require end-use maintenance.

Third, in exemplary implementations, this invention confers a mechanical advantage: the tension created in the motion transmission element can be significantly higher than the force applied directly to the tensioner.

Fourth, in exemplary implementations, the tensioner gives very fine control over the tension in the motion transmission element because movements of the clamp result in much smaller movements of the motion transmission element.

The above description of this invention is just a summary. It is intended only to give a general introduction to some illustrative implementations of this invention. It does not describe all of the details of this invention. This invention may be implemented in many other ways.

BRIEF DESCRIPTION OF THE DRAWINGS

FIG. 1A shows apparatus for applying tension to a toothed belt. FIG. 1B shows an enlarged detail view of part of that apparatus.

The above Figures illustrate some exemplary implementations of this invention, or provide information that relates to those implementations. The above Figures do not show all of the details of this invention.

DETAILED DESCRIPTION

In exemplary implementations of this invention, tension is applied to a motion transmission element with periodic features by causing that element to mesh with a device that has a slightly greater pitch.

Figure 2:
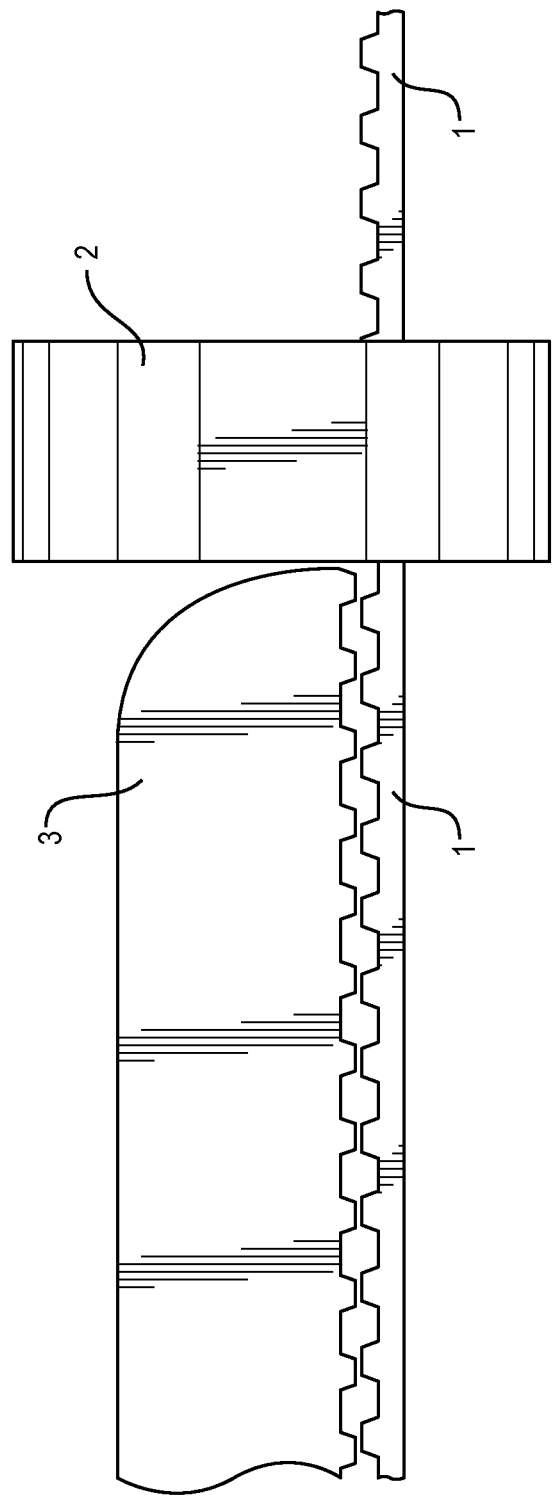
FIG. 2 shows a side view of part of that apparatus.

FIG. 1A shows apparatus for applying tension to a toothed belt 1, in an exemplary implementation of this invention. Only a portion of the belt is shown in FIG. 1A and 2 (as is also the case with the belts in FIGS. 3, 4 and 5). Both the belt 1 and rack 2 have teeth. A clamp 3 may be slid to the left in FIG. 1, so that the clamp compresses the belt 1 and rack 2 against each other in the area under pressure from the clamp 3. As the clamp 3 is slid along the long dimension of the rack 2 and belt 1, that area (where teeth of the belt and teeth of the rack engage) moves. Different jaws or surfaces of the clamp exert pressure on the belt 1 and clamp 3, respectively.

In the example shown in FIG. 1A, the width (in the belt's long axis) of the teeth in the toothed belt 1 is greater than the width (in the rack's long axis) of the teeth in the rack 2. FIG. 1B is an enlarged, detail view that shows this. In the example shown in FIG. 1B, the width of tooth 31 is greater than the width of tooth 32 (the difference in width of teeth 31 and 32 is exaggerated in FIG. 1B).

The rack 2 may be short. For example, it may be only three times the length of the pitch of the belt 1.

The pitch of the rack 2 is slightly larger than the pitch of the toothed belt 1. For example, the pitch of the belt 1 may be less than 100%, and more than 80%, of the pitch of the rack 2. In the example shown in FIG. 1, the pitch of the rack 2 is 1.1× larger than the pitch of the belt 1. This ratio can be varied, but if it is too small, there will not be enough displacement of the belt, and if it is too large, there will be too much resistance to be able to move the slider. The appropriate ratio depends in part on the degree of elasticity of the belt.

When the clamp 3 is slid to the left in FIG. 1 along the length of the rack 2, the clamp 3 locally clamps the belt 1 to the rack 2. As the clamp 3 progresses along the length of the rack 2, it forces the belt 1 to locally mesh with the more widely spaced features of the rack 2, causing the belt 1 to advance. In example shown in FIG. 1, every tooth on the rack 2 that the clamp 3 passes displaces the belt 1 an additional distance equal to 0.1× the pitch of the belt.

Thus, as the translation of the clamp 3 occurs, engagement of the teeth of the rack 2 and belt 1 respectively, which are of different pitch, causes a first force to be created or increased along the long dimension of the belt 1, which first force is in the direction of the translation. However, that first force is opposed by a second force that pulls the belt 1 in an opposing direction. These opposing forces, pulling on two different points of the belt in opposing directions, create tension in the portion of the belt between those two points.

In the example shown in FIG. 1, both ends 6, 7 of a single belt 1 are shown (but the part of the belt that loops back around is not shown). A second clamp 4 and an interlocking device 5 together prevent the belt 1 from slipping. By preventing belt end 6 from slipping, clamp 4 and interlocking device 5 together exert a second force that opposes the first force which is created when the other clamp 3 is slid along the rack 2.

However, other means of exerting this second, opposing force may be used. For example, the means may comprise any clamp, fastener, brake, lock or locking mechanism, holding device or integral attachment that tends to prevent part (including an end) of the belt 1 from being displaced, or that tends to move that part in an opposing direction. For example, the means may prevent slippage by friction, or by mechanically blocking movement of an object attached to the belt. The means may further comprise another object to which the holding mechanism is attached.

In the example shown in FIG. 1, shaft 8 is part of an attached belt-driven system. Shaft 8 fits through hole 9 of the tensioner. Alternately, this invention may be implemented without such a shaft and hole.

FIG. 2 shows a side view of part of FIG. 1.

Figure 3:
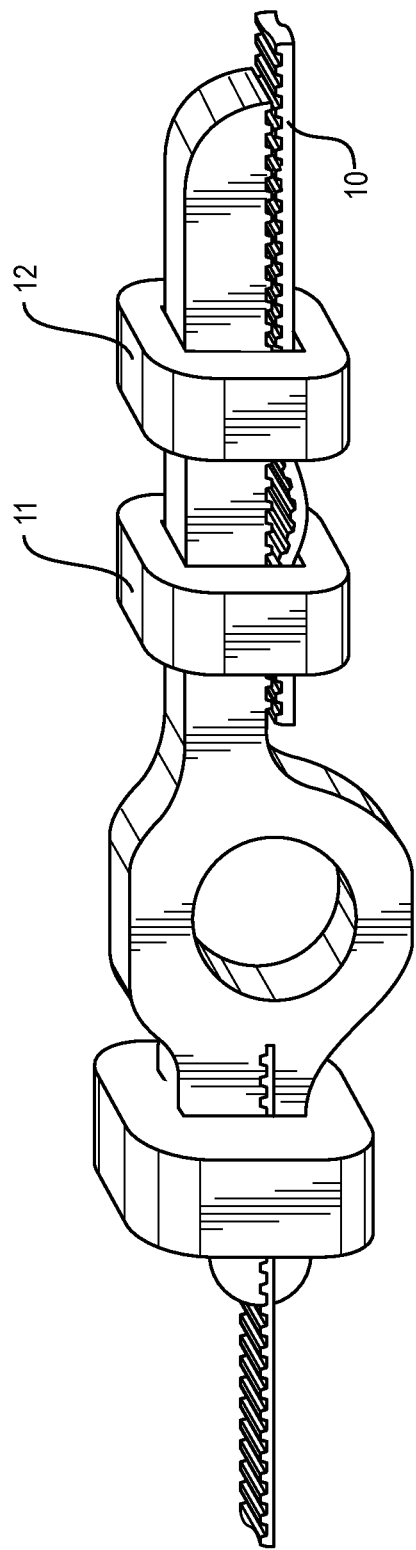
FIG. 3 shows an apparatus in which two sliding clamps (on the right side of the Figure) have been used to increase the displacement of the toothed belt.

FIG. 3 shows a working prototype of this invention. The prototype (except for the belt) was fabricated out of 6 mm acrylic using a 35 W Epilog® laser cutter. This prototype has been successfully employed, for example, in a x-y motion platform for milling, plotting and paper cutting. In this prototype, two sliders 11, 12 are used to achieve increased displacement of the belt 10.

Figure 4:
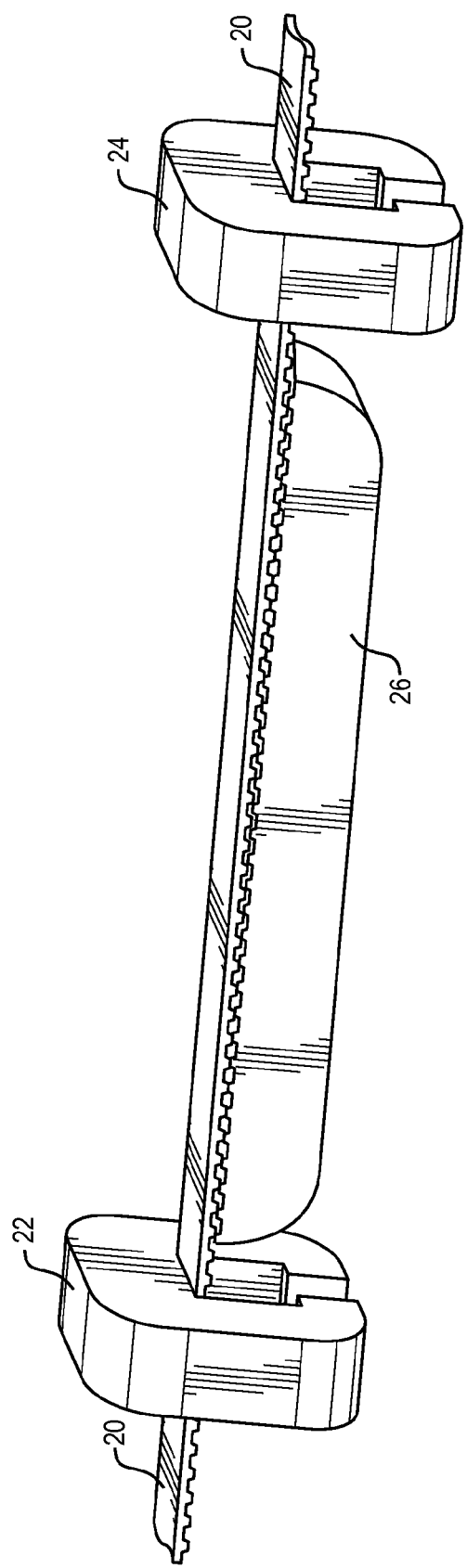
FIG. 4 shows a portion of a toothed belt that forms a continuous loop.
Figure 5:
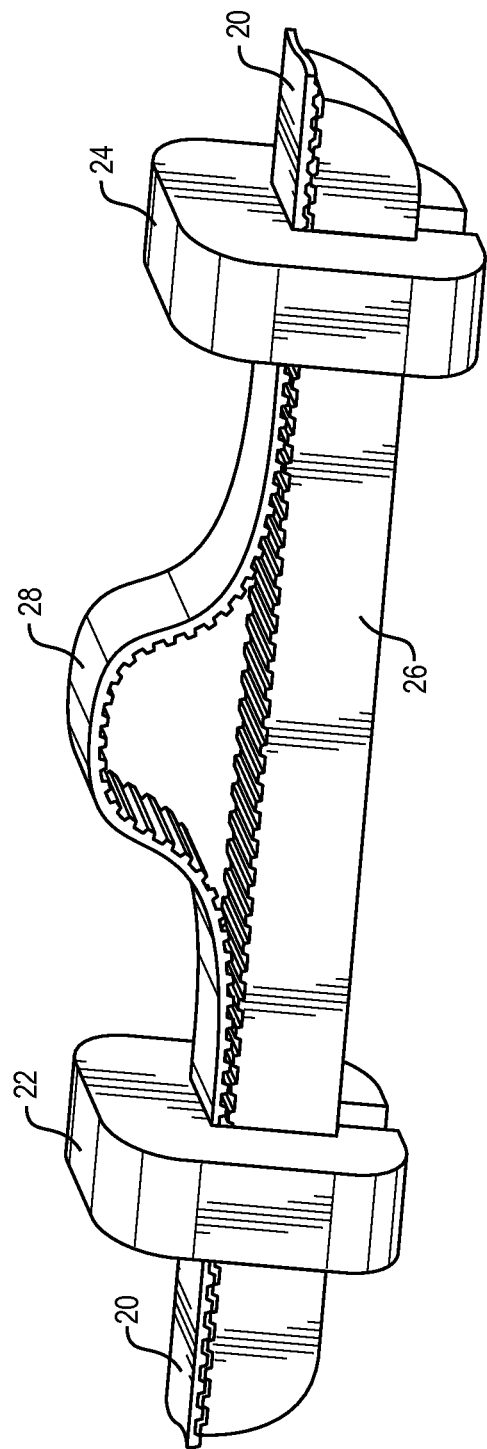
FIG. 5 shows the same scene as FIG. 4, except that two clamps have been moved towards each other along a rack to apply tension to the toothed belt.

In exemplary implementations, this invention may be used to tension a motion transmission element that is a closed loop. In that case, the clamps may be made "c" shaped so that they can be placed around a motion transmission element without being slid on from the end. FIGS. 4 and 5 show an example of this.

FIG. 4 shows a portion of a toothed belt 20 that forms a continuous loop. Two c-shaped clamps 22, 24 have been placed around the belt 20 near a rack 26.

FIG. 5 shows the same scene as FIG. 4, except that the two clamps 22, 24 have been moved towards each other along the rack 26 to apply tension to the belt 20.

In FIGS. 4 and 5, the movement of one of the clamps 22, 24 may be viewed as creating a first force, and the other of the clamps 22, 24 may be viewed as a means of exerting an opposing force.

In the example shown in FIG. 5, tension is applied to the portion of the belt to the right of clamp 24, the portion of the belt to the left of clamp 22, and the portion of the belt that loops around (not shown). These areas are not under local pressure from either of the clamps 22, 24. Of course, if at least two teeth of the belt and two teeth of the rack engage under a single clamp, then tension is also applied to the part of the belt that is under the local pressure of that clamp, because the pitch of the rack is greater than the pitch of the belt.

In the example shown in FIG. 5, the portion of the belt that is between clamps 22 and 24 (to the left of clamp 22 and to the right of clamp 24) is compressed along the belt's long dimension, rather than put under tension along that dimension. This results in kink 28.

In the example shown in FIGS. 4 and 5, the width (along the long axis of the respective devices) of the teeth of the belt and the rack are the same. In this example, the belt is sufficiently elastic that there is no need for a difference in width of the teeth of the rack and belt, respectively.

In exemplary implementations, this invention may be used to apply tension to a motion transmission element in a synchromesh, posidrive or conidrive mechanism.

In some implementations of this invention, the clamp is slid along the rack. In other implementations, the clamp rolls, rather than slides, along the rack (so that the clamping zone translates without the clamp sliding).

In exemplary implementations, the tensioner may be attached to other components of a machine. In some cases, the tensioner may replace other components that would otherwise be necessary to attach the motion transmission element to the machine.

It is helpful to define or clarify a few terms used herein:

"Clamp" includes (a) a clamp or (b) any other device for holding or securing objects tightly together through the application of pressure.

"Closed loop" means an elongated object that forms a continuous physical loop, so that its long dimension has no end.

"Holding mechanism" means a clamp, fastener, brake, lock or locking mechanism, holding device or integral attachment.

The terms "include", "includes" and "including" shall be construed broadly as if followed by the words "without limitation".

The term "long dimension" is not limited to only a straight object, but also may apply to a curved object.

"Motion transmission element" means a component of a machine or device, which component is adapted to move and to do at least one of the following: (a) to transmit its motion to at least one another object, or (b) to have motion transmitted to it by at least one other object. Examples of a motion transmission element include a belt, chain (e.g., a roller chain or ladder chain), and gear.

"Open loop" means an elongated object that does not form a continuous physical loop, so that its long dimension has two ends. For example, an open loop would be formed if a closed loop were cut, causing the cut edges to form two ends.

The term "opposing" is not limited to opposite directions on a straight line, but also can apply to a curve or curved surface. For example, consider a closed loop in the shape of a belt which, when viewed from the side, appears to be an ellipse or circle, and two forces, the first of which tends to cause the loop to rotate clockwise and the other of which tends to make the loop rotate counterclockwise, in both cases when viewed from the side. Then, in that example, the two forces are opposing forces, and they act in opposing directions.

A "rack" may be either straight or curved.

Examples of "spatially periodic" include the following: The teeth of a conventional toothed belt, gear, sprocket or rack are spatially periodic. The links of a conventional chain are spatially periodic.

This invention may be implemented in many different ways. Here are a few examples:

This invention may be implemented as an apparatus for applying tension to a first component, the first component being an elongated motion transmission element that is spatially periodic, which apparatus for applying tension comprises, in combination: (a) an elongated second component that is spatially periodic and has a pitch that is greater than the pitch of the first component, and (b) a clamp for exerting pressure while the clamp moves in a translation along the long dimension of the second component, which pressure (I) is created by different surfaces of the clamp applying force to the first and second components respectively, (II) compresses a portion of the first component and a portion of the second component against each other, and (III) causes spatially periodic features of the first and second components respectively to engage with each other in at least an area under the pressure. Furthermore, in exemplary implementations of this invention (including the apparatus described in the previous sentence): (1) the apparatus may further comprise the first component, (2) the first component may comprise an open loop, (3) the first component may comprise a closed loop, (4) the tension may occur in at least a portion of the first component that is outside of the area under the pressure, (5) the pitch of the first component may be less than 100%, and more than 80%, of the pitch of the second component, (6) the area under pressure may move along the long dimension of the second component as the translation occurs, (7) as the translation occurs, engagement of the spatially periodic features of the first and second components respectively, which are of different pitch, may cause a first force to be created or increased along the long dimension of the first component, which first force is in the direction of the translation, (8) the apparatus may further comprise a means for exerting a second force that opposes the first force; (9) the first component may be a belt or a chain; (10) the second component may a rack; (11) the apparatus may comprise a synchromesh or a posidrive mechanism; and (12) the spatially periodic features of both the first and second components may be teeth, and the width (along the long dimension of the first component) of the teeth of the first component may be greater than the width (along the long dimension of the second component) of the teeth of the second component.

This invention may be implemented as a method for applying tension to a first component, wherein the first component is a motion transmission element, the first component and a second component are each elongated and are each spatially periodic, and the pitch of the first component is less than the pitch of the second component, which method comprises: (a) moving a clamp in a translation along the long dimension of the first component, and (b) as the translation occurs, exerting pressure with the clamp, which pressure (I) compresses a portion of the first component and a portion of the second component against each other, and (II) causes spatially periodic features of the first and second components to mesh with each other in at least an area under the pressure. Furthermore, in exemplary implementations of this invention (including the method described in the previous sentence): (1) the pressure may be exerted by pressing a first surface of the clamp against the first component and pressing a second surface of the clamp against the second component; (2) as the translation occurs, a first force may be created or increased along the long dimension of the first component, which first force is in the direction of the translation, (3) a second force may oppose the first force, (4) the tension may occur in at least a portion of the first component that is outside of the area under the pressure, and (5) the spatially periodic features of both the first and second components may be teeth, and the width (along the long dimension of the first component) of the teeth of the first component may be greater than the width (along the long dimension of the second component) of the teeth of the second component.

CONCLUSION

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. An apparatus for applying tension to a first component, the first component being an elongated motion transmission element that is spatially periodic, which apparatus for applying tension comprises, in combination:
    a second component that is elongated and spatially periodic and has a pitch that is greater than the pitch of the first component, and
    a clamp for exerting pressure while the clamp moves in a translation along a long dimension of the second component, which pressure
        is created by different surfaces of the clamp applying force to the first and second components respectively,
        compresses a portion of the first component and a portion of the second component against each other, and
        causes spatially periodic features of the first and second components respectively to engage with each other in at least an area under the pressure.

2. The apparatus of claim 1, wherein the apparatus further comprises the first component.

3. The apparatus of claim 1, wherein the first component comprises an open loop.

4. The apparatus of claim 1, wherein the first component comprises a closed loop.

5. The apparatus of claim 1, wherein the tension occurs in at least a portion of the first component that is outside of the area under the pressure.

6. The apparatus of claim 1, wherein the pitch of the first component is less than 100%, and more than 80%, of the pitch of the second component.

7. The apparatus of claim 1, wherein the area under pressure moves along the long dimension of the second component as the translation occurs.

8. The apparatus of claim 1, wherein, as the translation occurs, engagement of the spatially periodic features of the first and second components respectively, which are of different pitch, causes a first force to be created or increased along the long dimension of the first component, which first force is in a direction of the translation.

9. The apparatus of claim 8, wherein the apparatus further comprises a means for exerting a second force that opposes the first force.

10. The apparatus of claim 1, wherein the first component is a belt.

11. The apparatus of claim 1, wherein the second component is a rack.

12. The apparatus of claim 1, wherein the spatially periodic features of both the first and second components are teeth, and wherein a width (along the long dimension of the first component) of the teeth of the first component is greater than a width (along the long dimension of the second component) of the teeth of the second component.

13. A method for applying tension to a first component, wherein
the first component is a motion transmission element,
the first component and a second component are each elongated and are each spatially periodic, and
a pitch of the first component is less than a pitch of the second component,
which method comprises:
moving a clamp in a translation along a long dimension of the first component, and
as the translation occurs, exerting pressure with the clamp, which pressure
compresses a portion of the first component and a portion of the second component against each other, and
causes spatially periodic features of the first and second components to mesh with each other in at least an area under the pressure.

14. The method of claim 13, wherein the pressure is exerted by pressing a first surface of the clamp against the first component and pressing a second surface of the clamp against the second component.

15. The method of claim 13, wherein
as the translation occurs, a first force is created or increased along the long dimension of the first component, which first force is in a direction of the translation, and
a second force opposes the first force.

16. The method of claim 13, wherein the tension occurs in at least a portion of the first component that is outside of the area under the pressure.

17. The method of claim 13, wherein the spatially periodic features of both the first and second components are teeth, and wherein the width (along the long dimension of the first component) of the teeth of the first component is greater than the width (along the long dimension of the second component) of the teeth of the second component.

* * * * *